US011347929B1

(12) United States Patent
Lee

(10) Patent No.: US 11,347,929 B1
(45) Date of Patent: May 31, 2022

(54) METHOD AND SYSTEM FOR LINKING PRODUCT PAGE ON SOCIAL MEDIA

(71) Applicant: Shopify Inc., Ottawa (CA)

(72) Inventor: John Jong-Suk Lee, Waterloo (CA)

(73) Assignee: Shopify Inc., Ottawa (CA)

( * ) Notice: Subject to any disclaimer, the term of this patent is extended or adjusted under 35 U.S.C. 154(b) by 0 days.

(21) Appl. No.: 17/186,457

(22) Filed: Feb. 26, 2021

(51) Int. Cl.
*G06F 40/134* (2020.01)
*G06F 16/955* (2019.01)
*H04L 51/52* (2022.01)
*H04L 51/00* (2022.01)

(52) U.S. Cl.
CPC ........ *G06F 40/134* (2020.01); *G06F 16/9558* (2019.01); *H04L 51/16* (2013.01); *H04L 51/32* (2013.01)

(58) Field of Classification Search
CPC ... G06F 40/134; G06F 16/9558; H04L 51/32; H04L 51/16
See application file for complete search history.

(56) References Cited

U.S. PATENT DOCUMENTS

| | | | |
|---|---|---|---|
| 2017/0032447 A1* | 2/2017 | Gerber | G06Q 30/0633 |
| 2017/0302613 A1* | 10/2017 | Imbrie | H04L 51/26 |
| 2018/0300756 A1* | 10/2018 | Saxena | G06Q 30/0255 |
| 2019/0095976 A1* | 3/2019 | Stubbs | G06Q 50/01 |
| 2021/0065018 A1* | 3/2021 | Podgorny | G06Q 50/01 |
| 2021/0142381 A1* | 5/2021 | Gutman | G06Q 30/0621 |

* cited by examiner

*Primary Examiner* — Caroline H Jahnige
(74) *Attorney, Agent, or Firm* — Moffat & Co

(57) ABSTRACT

Systems, methods and manufactures related to providing links to products and services on social media are disclosed. The method, at a computing system, the includes identifying, for a post on a social media platform, a product or a service associated with the post; finding an e-commerce site selling the product or service; monitoring comments to the post on the social media platform; determining that a comment relates to where to obtain the identified product or service; and providing a link to the product or service on the e-commerce site as a response to the comment.

18 Claims, 6 Drawing Sheets

METHOD AND SYSTEM FOR LINKING PRODUCT PAGE ON SOCIAL MEDIA

FIELD OF THE DISCLOSURE

The present disclosure relates to social media posts, and in particular relates to comments based on social media posts.

BACKGROUND

During the normal use of social media, comment sections may be inundated with several comments unrelated to each other. This may lead to several comment threads regarding the same topics.

In some cases, a post on social media may relate to a product or service. Comments related to the post may, in some cases, ask how the commenter may obtain the product or service. However, when multiple similar such comments are made, especially when multiple threads in a comments section exist, this can lead to clutter, and frustration for the original poster who repeatedly must answer the same question.

SUMMARY

The present disclosure relates to the answering of questions in a social media feed regarding how to obtain a product or service related to a social media post. In particular, often social media feeds become cluttered with different users asking the same question. When the original post includes a product or service found therein, many questions in the comment section are often related to the source of such product or service. Answering all of these questions leads to frustration for the user posting the original post, which may lead this user to simply ignore such questions or to disengage with the social media platform. It also provides clutter for those following such user and reviewing the comments from the post.

To overcome this, in accordance with various embodiments of the present disclosure, an engine at a social media platform may identify one or more products or services within a social media feed, may identify a source for such products or services, and may thereafter monitor comment sections and provide links to the source of the product or service if a relevant question is asked in the comment section. The provision of the links may be done either as based on suggestions to the original poster or automatically in response to a question in the comment section.

In some embodiments, at least a subset of the comments asking for a source of products or services may be obscured to reduce clutter in the comments section.

Therefore, in one aspect, a method at a computing system is provided, where the method may include identifying, for a post on a social media platform, a product or service associated with the post; finding an e-commerce site selling the product or service; monitoring comments to the post on the social media platform; determining that a particular comment relates to obtaining the identified product or service; and providing a link to the product or service on the e-commerce site as a response to the particular comment.

In some embodiments the produce or service is identified may further include using a link from a user that posted the post on the social media platform.

In some embodiments, the identifying may be based on content of the post and/or subsequent comments by a user who made the post.

In some embodiments, a plurality of products or services may be identified, the method may further comprise ranking the plurality of products or services based on relevance within the post.

In some embodiments, the method may further comprise using disambiguation to identify the product or service based on one or more questions in comments.

In some embodiments, the finding the e-commerce site may comprise performing a search of a plurality of ecommerce sites for the identified product or service.

In some embodiments, the search may comprise at least one of a text search and an image search.

In some embodiments, the method may further comprise obscuring the comment to the post containing the question and the answer.

In some embodiments the method may further comprise substituting a link posted by a third party commenter with the link to the e-commerce site found by the computing system.

In another aspect a computer system is provided, where the computer system may comprise a processor; and a communications subsystem, and where the computer system may be configured to: identify, for a post on a social media platform, a product or a service associated with the post; find an e-commerce site selling the product or service; monitor comments to the post on the social media platform; determine that a particular comment relates to obtaining the identified product or service; and provide a link to the product or service on the e-commerce site as a response to the particular comment.

In some embodiments, the computer system may be further configured to identify the product or service based on a link provided by a user that posted the post on the social media platform.

In some embodiments, the computer system may be further configured to identify based on content of the post and/or subsequent comments by a user who made the post.

In some embodiments, the computer system may be further configured to identify a plurality of products or services associated with the post; and to rank the plurality of products or services based on relevance within the post.

In some embodiments, the computer system may be further configured to use disambiguation to identify the product or service based on one or more questions in comments.

In some embodiments, the computer system may be configured to find the e-commerce site by performing a search of a plurality of ecommerce sites for the identified product or service.

In some embodiments, the search may comprise at least one of a text search and an image search.

In some embodiments, the computer system may be further configured to obscure the comment to the post containing the question and the answer.

In some embodiments, the computer system may be further configured to substitute a link posted by a third party commenter with the link to the e-commerce site found by the computing system.

In another aspect, a non-transitory computer readable medium storing instruction code is provided. The instruction code, when executed by a processor of a computer system may cause the computer system to: identify, for a post on a social media platform, a product or a service associated with the post; find an e-commerce site selling the product or service; monitor comments to the post on the social media platform; determine that a particular comment relates to obtaining the identified product or service; and provide a link to the product or service on the e-commerce site as a response to the particular comment.

BRIEF DESCRIPTION OF THE DRAWINGS

The present disclosure will be better understood with reference to the drawings, in which.

DETAILED DESCRIPTION

The present disclosure will now be described in detail by describing various illustrative, non-limiting embodiments thereof with reference to the accompanying drawings. The disclosure may, however, be embodied in many different forms and should not be construed as being limited to the illustrative embodiments set forth herein. Rather, the embodiments are provided so that this disclosure will be thorough and will fully convey the concept of the disclosure to those skilled in the art.

In accordance with the embodiments of the present disclosure, methods and systems are provided to automatically respond to questions in a social media feed regarding a product or service described in a post. As used herein, social media is an interactive computer-based technology that includes websites and applications that enable users to create and share content or to participate in social networking. Such social media may include, but is not limited to, Facebook™, Instagram™, LinkedIn™ YouTube™, Pinterest™, Vimeo™, Twitter™, Blogger™, TikTok™, WeChat™, Tumblr™, Sina Weibo™, SnapChat™, among others.

In accordance with the embodiments of the present disclosure, an engine within a social media platform may monitor posts and comments and identify or determine products or services related to the post and an e-commerce site that may provide those products or services.

Once the products or services, as well as an e-commerce site, are identified, the engine within the social media platform may monitor comments being made in response to the original post. The engine associated with the social media site may identify particular comments which are requesting information about where to obtain a product or service within the original post, and may automatically answer such comments. In some cases, the comment requesting information about where to obtain the product or service and the answer may then be obscured from the comment section in order to clean up the comment section and reduce clutter. The question and answer may be obscured by ranking the comment lower to place it lower in the social media feed, by deleting the question and answer, by suggesting a response prior to the question being posted, among other options.

Training may be provided to an engine in order to help the engine identify and determine products or services in a post. Further, training may be provided to an engine to help the engine identify questions regarding products or services within a post.

The subject matter of the present application is further described below.

Computing Environment

The embodiments of the present disclosure could be implemented on any suitable computer system. One example operating environment for the present disclosure is provided with reference to FIG. 1. However, the embodiment of FIG. 1 is merely provided as an example, and different computing environments are possible.

Figure 1:
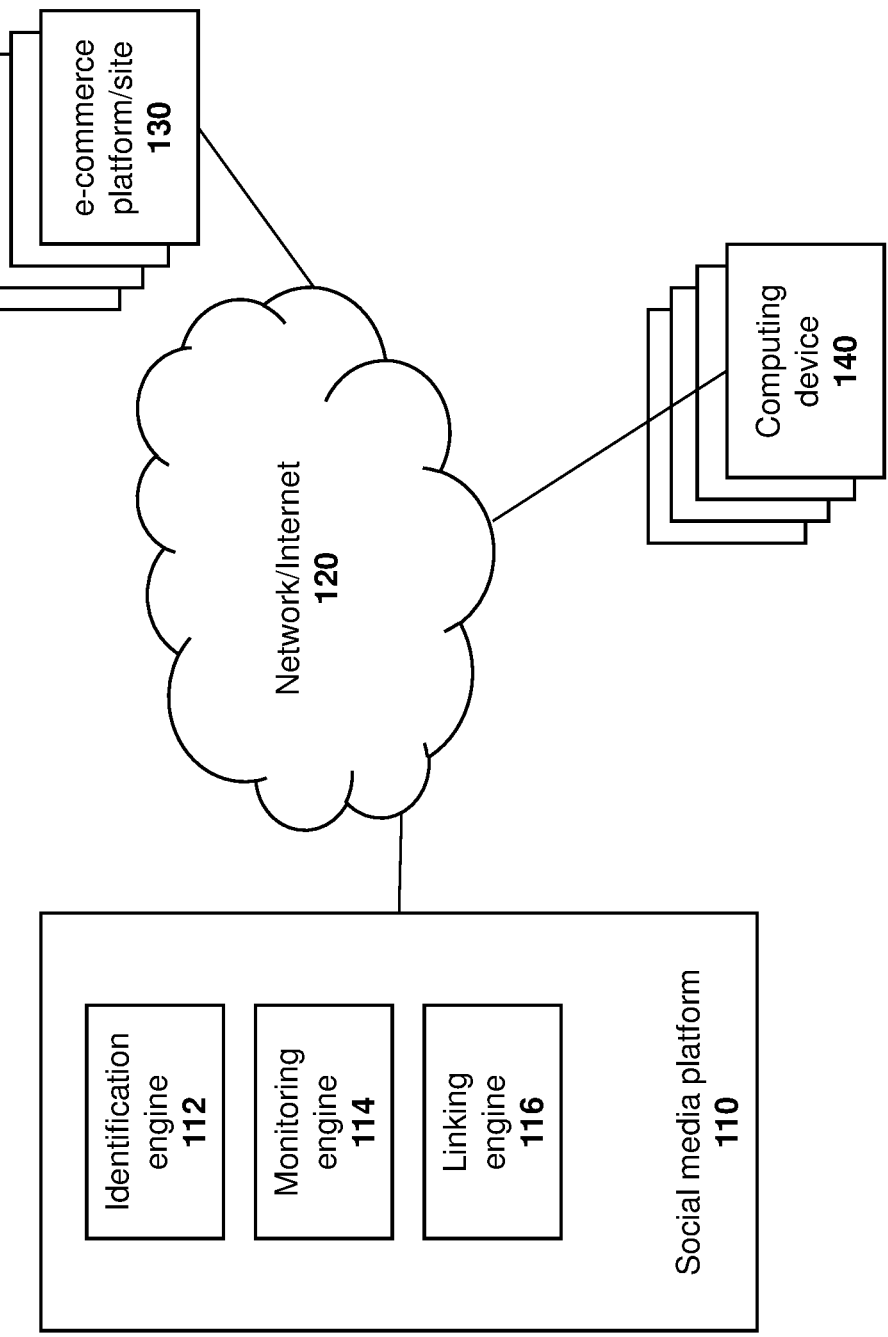
FIG. 1 is a block diagram showing an example computing environment capable of being used with the embodiments of the present disclosure.

In the embodiment of FIG. 1, a social media platform 110 may consist of any server or group of servers located within a network. For example, social media platform 110 may be part of a cloud service. In some cases, social media platform 110 may consist of a server such as a web server associated with the platform or application. In some cases, social media platform 110 may consist of a plurality of servers. Other options for social media platform 110 are possible.

In accordance with the embodiments of the present disclosure, social media platform 110 may include various engines in order to provide the methods and systems disclosed herein. In particular, social media platform 110 includes, in the example of FIG. 1, an identification engine 112 which is capable of identifying an e-commerce platform, product or service based on a social media post, as described in more detail below.

Social media platform 110 may further include a monitoring engine 114 which may monitor social media feeds to determine whether users are requesting information about a product or service within a post, as described in more detail below.

In some embodiments, a linking engine 116 may be used to insert a link into the social media feed to point to an e-commerce site, or the location of the product or service within such e-commerce site, based on the determination at the monitoring engine 114. In some cases, the linking engine 116 may provide suggestions to the user who originally posted the social media post to respond to questions with regard to a store, product or service. In some cases, linking engine 116 may obscure a question and response in the social media feed. As used herein, the obscuring may involve hiding a question and answer, deleting a question-and-answer, moving a question and answer to a portion of the social media feed that is deemed less relevant, among other options. Linking engine 116 is described in more detail below.

In the example of FIG. 1, identification engine 112, monitoring engine 114, and linking engine 116 are all shown within social media platform 110. However, this is merely a logical association, and each engine may be co-located with the other engines or may be located on different servers or in different cloud services.

Social media platform 110 may communicate, through a local or wide area network such as Internet 120, to other computing devices and services. For example, in one case, social media platform 110 may communicate with one or more of a plurality of e-commerce platforms or sites 130. An e-commerce platform may, for example, consist of a plurality of shops and such platform may host the shops. An e-commerce shop may be any retailer capable of selling goods or services over the Internet.

In the example of FIG. 1, a plurality of computing devices 140 may interact with one or both of social media platform 110 and e-commerce platform/site 130 through Internet 120. For example, computing device 140 may be a user's home or work computer, laptop, mobile device, tablet, smartphone, among other such options.

In some cases, computing device 140 may be associated with a merchant and be used to configure a shop.

The elements in FIG. 1 are merely provided as examples, and in some cases further servers, repositories or services may be part of such computing environment. In some cases, various servers, modules, repositories or services shown in FIG. 1 may be omitted from the computing environment. Therefore, the embodiment of FIG. 1 is merely provided as an illustration of one example computing environment in which the embodiments of the present disclosure may operate.

Servers or computer systems for social media platform 110, computing device 140, servers or computing devices associated with e-commerce platform/site 130, as well as any services and repositories associated with the elements of FIG. 1 could be implemented on any type of, or combination of, computing devices. For example, one simplified computing device that may perform the embodiments described herein is provided with regard to FIG. 2.

Figure 2:
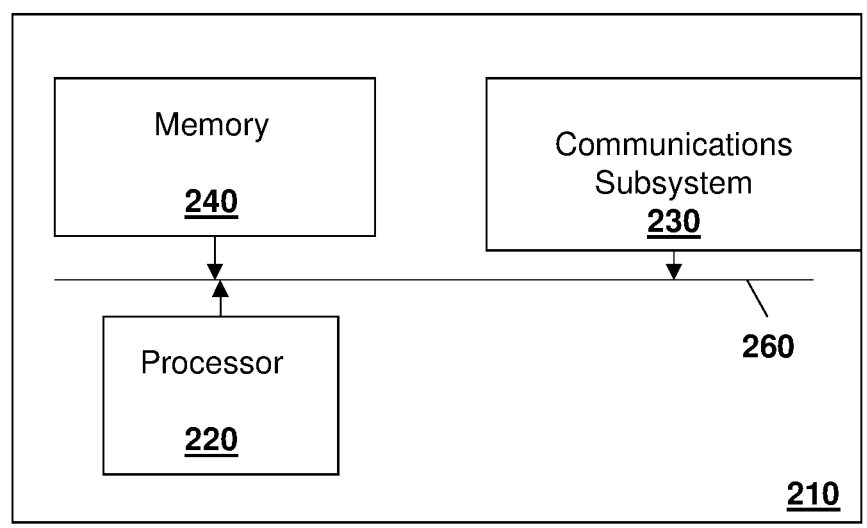
FIG. 2 is a block diagram showing a simplified computing device capable of being used with the embodiments of the present disclosure.

In FIG. 2, computing device 210 includes a processor 220 and a communications subsystem 230, where the processor 220 and communications subsystem 230 cooperate to perform the methods of the embodiments described herein.

The processor 220 is configured to execute programmable logic, which may be stored, along with data, on the computing device 210, and is shown in the example of FIG. 2 as memory 240. The memory 240 can be any tangible, non-transitory computer readable storage medium, such as DRAM, Flash, optical (e.g., CD, DVD, etc.), magnetic (e.g., tape), flash drive, hard drive, or other memory known in the art. In one embodiment, processor 220 may also be implemented entirely in hardware and not require any stored program to execute logic functions.

Alternatively, or in addition to the memory 240, the computing device 210 may access data or programmable logic from an external storage medium, for example through the communications subsystem 230.

Memory 240 and/or an external storage medium may be used to store instruction code, which, when executed by a processor of a computing device cause the computing device to perform the methods and embodiments of the present disclosure.

The communications subsystem 230 allows the computing device 210 to communicate with other devices or network elements.

Communications between the various elements of the computing device 210 may be through an internal bus 260 in one embodiment. However, other forms of communication are possible.

Social Media Feeds

There are various ways that products, services, or stores could form part of a social media feed. For example, reference is now made to FIG. 3, which shows a simplified example of one social media feed. In the feed, a user has created a post including a text portion 310 and an image portion 312. However, in other embodiments the post may include only text, only an image, or may include other media such as videos, among other options.

Figure 3:
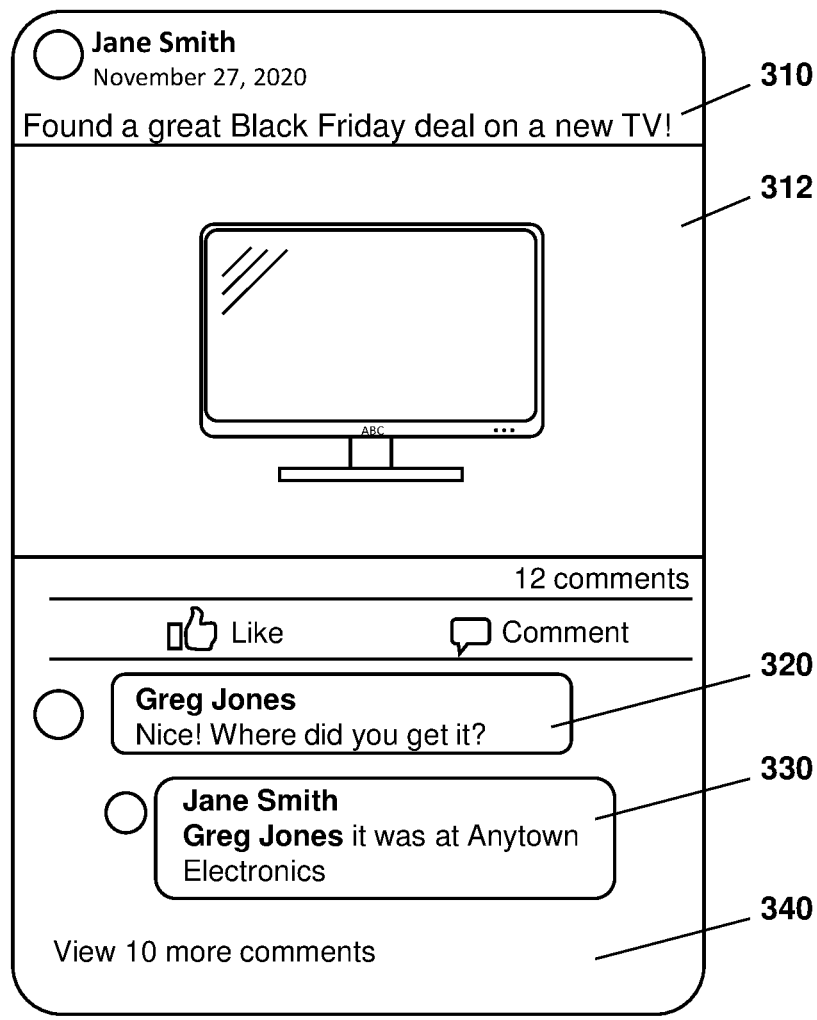
FIG. 3 is a block diagram showing an example user interface screen of a social media feed in which the poster is discussing a product.

Further, in the example of FIG. 3, a comment section includes a question 320 from a second user asking where the user posting the original post obtained a product or service.

Further, in the example of FIG. 3, the original poster has posted a response 330 which indicates the store or e-commerce site from which the product or service was obtained.

In the example of FIG. 3, the comments may be sorted by relevance and only the most relevant comments shown where other comments are behind a click screen in which someone viewing the social media feed would have to click on link 340 in order to view the further comments.

As described above, often users do not read previous comments and therefore the user posting the original post may be asked repeatedly where they obtained a product or service. This may be both annoying to the user who submitted the original post, and may clutter the comment section for those reading the comment section.

In this regard, the embodiments of the present disclosure provide for methods and systems that may identify products or services within a post, identify an e-commerce site based on the identified products or services, as well as other criteria, and automatically respond to questions with regard to such products or services.

Figure 4:
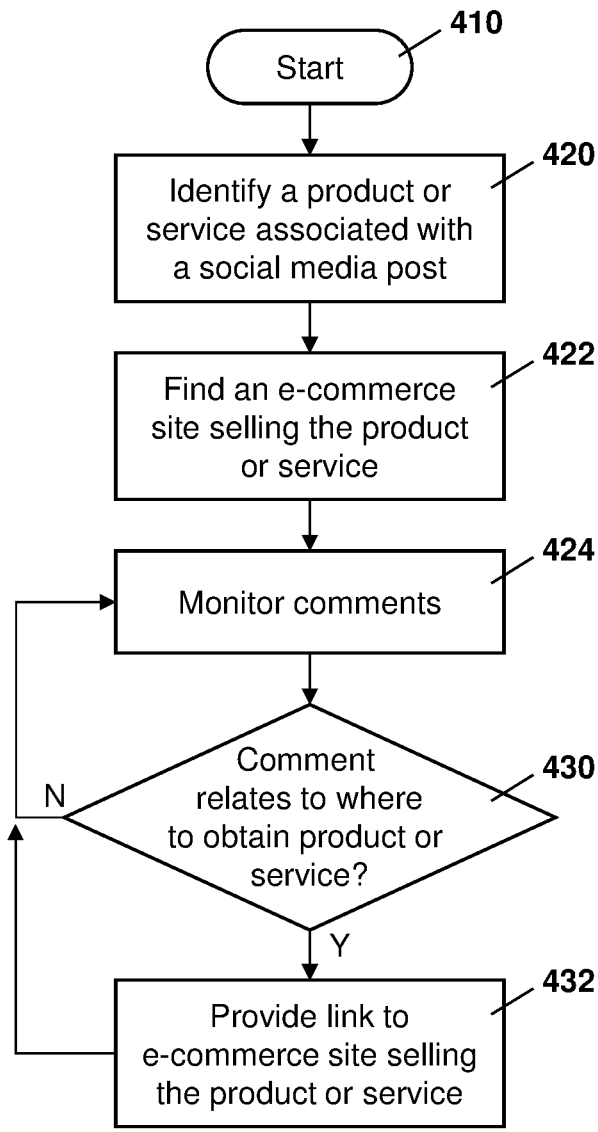
FIG. 4 is a process diagram showing an example process for identifying a product or service and responding to questions about the product or service.

Reference is now made to FIG. 4. The process of FIG. 4 starts at block 410 and proceeds to block 420 in which a computing system may identify a product or service associated with a social media post, and to block 422 in which the computing system may find a source for such product or service.

Specifically, an engine at the social media platform may recognize one or more products and associate such products or services with an e-commerce site in a variety of ways.

In a first embodiment, the product and e-commerce site may be identified based on the post and/or comments of the original poster. For example, one comment to the social media post may ask where the poster obtained a product or service and the poster (or in some cases, another commenter) may answer with a link to a product or service. This link could thereafter be used for other similar queries by other commenters.

For example, referring to the embodiment of FIG. 3, the identification engine at the social media platform may parse or analyze the response in comment 330 to determine the good, product or e-commerce platform. In the example of FIG. 3, the source of the product is identified as "Anytown Electronics". In this case, the identification engine could determine whether Anytown Electronics has an e-commerce shop and store a link to the generic shop landing page. In some cases, disambiguation or libraries could be used for shops identified with nicknames or with spelling errors, among other options.

In other embodiments, if comment 330 included a link to the product, then the identification engine could scrape such a link from the comment and use such link in the response to questions about the source of the product or service. In some cases, the link could be checked against information in the post to ensure the same product or service from the post is being linked to, and the link may be discarded if it is unrelated to the product or service in the post, as found for example in the text, video or image of the post.

In still further embodiments, other information submitted by the user who created the original post could be used to attempt to identify the product or service more specifically. For example, in the text portion of the original post, the user specified that she was discussing a television. Text or language recognition could be used to identify products or services within such text 310. Further, if other information is provided in the text then this information could also be used to help identify the product. For example, if the text or a subsequent comment said that the television was 65", this could be used to help identify the product. Therefore, besides the type of product or service, characteristics about the product or service could be sought in the original post or subsequent comments.

Further, in some cases image recognition could be used if the user posted an image or video. For example, if the image of the television in image 312 could be matched to an image on the e-commerce shop associated with Anytown Electronics, then a link to the specific product could be found by the identification engine. In this case, a confidence score may be assigned based on how closely the image matches with the image found on the e-commerce shop, and the identification engine may only provide the link with the more specific information if the confidence score in the link exceeds a threshold. Other options are also possible.

In still a further embodiment, a user posting a new post may be given an option to provide a link to a source of the product. Such link would not be shown, but could be stored at the identification engine. For example, when a user composes a post, prior to the post being uploaded to the social media platform, the application or website on which the user is posting may prompt the user to input a source for a product or service in the post. This may in some cases be done for all posts, by asking whether there are any products or services in the post, what they are, and where they were obtained. In other cases, the identification engine may review the post during the upload process and prompt the poster with specific questions about products or services, and where to obtain them, in the post.

In still further cases, the identifying at block 420 may not include a source of the product. Instead, characteristics of the product may be provided in text in the original post or subsequent comments, or in an image or video associated with the post. For example, if the posted image showed someone playing with a dog and a dog toy, and the text said "Rex is having fun with his new toy", then language parsing and image recognition may be used in an attempt to identify the dog toy. Other information such as a later post indicating that the dog toy is an ABC brand dog toy, or the name of the toy, may be used to increase a confidence that the product or service was identified correctly. Other posts or comments made by the same user could be cross-checked to see if the user provided information in such other posts or comments regarding the dog toy. Again, these could increase a confidence score that the product was identified correctly. In this case, the identification engine may consider that it has identified the product or service if the confidence score exceeds a threshold.

In some cases, extrinsic evidence could also be used. For example, if the social media platform included or had access to data for an e-commerce platform that the user making the original post used to buy the dog toy, this information could be correlated to the original post and the identity of the product and potentially the source of the product identified.

Based on the product identification, the engine may search for e-commerce sites that sell the identified products (or similar product categories depending on the level of identification of the product). For example, if the dog toy can be identified by its type and brand, then a search of e-commerce sites for the type and brand of dog toy may be made, as described below. If the identification engine can only identify that the dog is playing with a dog toy, then a link to an e-commerce site that sells pet products can be found, and in some cases a message indicating the link is for a seller of general pet products may be provided.

The engine looks for product links or service links to known products or service presentation links from e-commerce servers. In some cases, the search of e-commerce sites may use approved or partner sites to perform the search.

For example, the social media platform may maintain a list or database of approved e-commerce sites, with types of products sold by such sites in some cases, where a search for an e-commerce site starts at this database or repository.

In some cases, the social media platform may have a partnership with an e-commerce platform that could provide access to a repository of stores and metadata about such stores to facilitate the search.

In some cases, the search of the e-commerce site may limit the search to the geographic area of the user making the original post or the user making the comment regarding where to find the product. For example, the search may be limited to the same country, state, province or region as the original poster or as the person asking for the source of the product or service.

In some embodiments, more than one product or service may be identified from the original post. In this case, the identified products could be ranked. For example, if a dominant portion of the image is taken up by a first product, this may be ranked as the highest priority product for answering generic questions regarding the image, as described below.

In some cases, the context of the original post may be analyzed to determine the ranking of the identified products. For example, if the original post says "Playing with my dog and his new toy", the dominant or highest ranked product may be the dog toy.

In some cases, the products may be ordered based on subsequent comments which were answered by the original poster and which indicate that a particular product is the dominant product in the image or video.

In some cases, the products or services may be ordered based on a confidence level in the identification of the products or services.

Other options are possible in addition or as alternative to those example manners enumerated above.

Based on the above, the post may be analyzed to identify one or more products or services associated with the post, and further find an e-commerce site that could provide such good or service.

Answering Comments

Once at least one product or service related to an original post is identified and an e-commerce site found, the engine at the social media platform may thereafter monitor comments and if a question regarding one or more of the products or services in the original post is asked, a link to an e-commerce site, or to a specific product or service at the e-commerce site, may be automatically posted, as described below.

In particular, reference is made to FIG. 4. From block 422, the process proceeds to block 424 in which a monitoring engine at the computer system may monitor comments within a social media feed. The monitoring may occur after the comment is uploaded to the social media platform, or may occur during the uploading process for the comment.

Once a comment is detected, the process then proceeds to block 430 in which a check is made to determine whether the comment relates to the origin of the product or service. For example, the monitoring engine may parse comments to determine whether the comment contains a question of where to obtain a product or service. In some cases, the monitoring engine may use artificial intelligence to detect such question, and a machine learning or artificial intelligence module may be trained based on historic questions on the social media platform, as described below. In other cases, the monitoring engine may compare all or part of a comment with a database or library of questions to determine that a question about the origin of products or services is being asked. Other options are possible.

If, at block 430, it is determined that the comment does not ask for the origin of a product or service, the process proceeds back to block 424 and continues to monitor comments in the social media feed.

Conversely, from block 430, if a determination is made that the comment relates to a question on where to obtain the product or service, the process proceeds to block 432.

At block 432, a linking engine may provide a link to an e-commerce site selling the product or service. The link may be a general link to the site or may be a link to the specific product or service in some embodiments. The link may be presented in various ways. In some cases, the linking engine may be the same entity as the monitoring engine and/or the identification engine. In some cases, each can be a separate entity.

Figure 5:
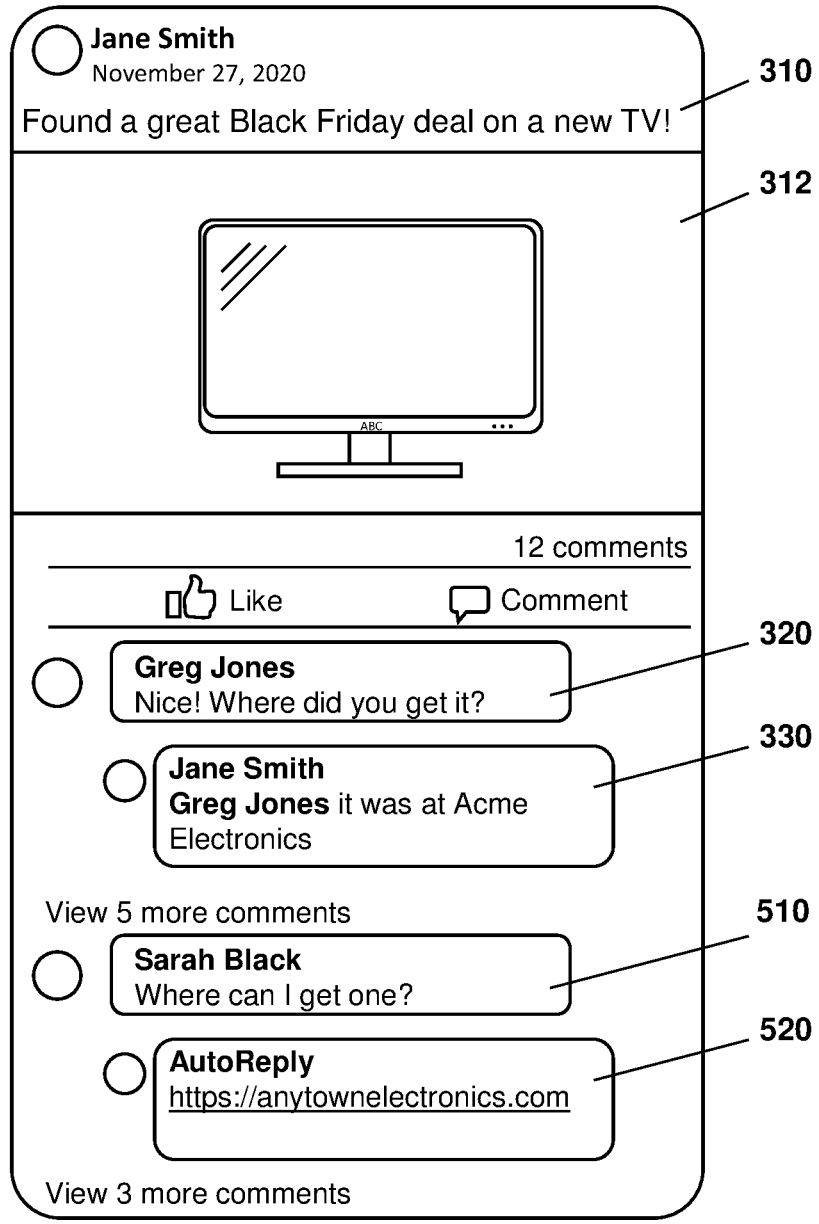
FIG. 5 is a block diagram showing an example user interface screen of a social media feed in which a second question regarding a source for a product or service is asked and a response is generated.

For example, in some cases, the engine at the social media platform may wait for the original poster to respond to the question about where the service or product was obtained and then use the answer to verify, and possibly revise, the product or service identified at block 420 and/or the e-commerce site identified at block 422. Subsequently, if another question is asked about the same product or service, the social media platform may, in some embodiments, automatically answer the question. This is shown, for example, in FIG. 5, which is a continuation of the example of FIG. 3, and in which like numbering is used. In the embodiment of FIG. 5, a subsequent question 510 is asked on where to obtain the product or service referred to in the original post. In this case, an auto reply at block 520 may be inserted with a link to an e-commerce site, or to a specific product or service on the e-commerce site. The link may be any address used to identify the location of the e-commerce site and/or the product or service at the e-commerce site, and can include but is not limited to a uniform resource locator (URL), uniform resource identifier (URI), a shortened URL, or other address or link as would be known to those skilled in the art.

While the example of FIG. 5 shows the response is being from "AutoReply", in some cases, other sources for the response could be identified. This may, for example, also include the original user that posted the social media post. In this case, in some embodiments rather than putting an automatic reply, a prompt to the original poster may be provided in which a link is suggested. In this way, the original poster may still have control over the responses in the feed that are attributed to such poster.

Further, in the example of FIG. 5, the link shows a link to the general e-commerce site and not to the particular product or service. However, in some cases, the link could be to a particular product or service if such product or service was identified with a threshold confidence level at block 420.

In other embodiments, the engine at the social media platform may either suggest or automatically insert a link to the source of the product or service on the first occasion that a question is asked about a product or service within the comment stream. Specifically, this would be responsive to the question asked at comment 320. The social media platform may either provide an answer directly in response to a question about where to obtain a product or service, or may suggest an answer to the original poster who could then use the suggestion to easily respond to the question. This embodiment may, for example, occur if a confidence level at both block 420 and block 422 exceeded a confidence threshold.

In some cases, the link provided at block 520 may be to the e-commerce site that the original poster actually obtained the product from. This information, for example, may be obtained based on information within the post or comment section, extrinsic information regarding the purchase history of the original poster, other posts or comments made by the original poster, among other options.

In some cases, the link provided at block 520 may be to an e-commerce site that sells the particular product but is not necessarily the e-commerce site from which the original poster obtained the product or service. Thus, for example, the engine at the social media platform at block 422 may identify at least one source for a product or service. This identification may, for example, use a partner e-commerce site, and use this link to indicate one possible source for the product or service. In this case, the social media platform may rank e-commerce shops based on whether such e-commerce shop is a partner with the social media platform or not.

In some cases, the engine at the social media platform may use disambiguation to find the product or service that is being questioned. For example, generic questions such as: "Where did you get that?" may not point to any particular product or service. In this case, if the engine has a ranking of the products or services as described above, the engine at the social media platform may choose the highest ranked product or service (or a collection of multiple products or services that are the highest ranked) for the response to the question.

In some cases, the question may include some context. For example, the question may be "Your dog looks like he's having so much fun. Where did you get that?" In this case, the product being discussed has something to do with the dog having fun and disambiguation could be used to identify the product in question. For example, such disambiguation could involve parsing the question to identify product categories, perform word association and provide scores based on words in the question, scraping information from e-commerce sites, among other options. In some cases, the disambiguation could use a natural language processor to identify a context for the question. Other examples are possible and various natural language processing techniques may be applied, potentially in combination.

Further, if an engine at a social media platform answers a question about a product or service, in some cases the social media platform may obscure both the comment and the answer in order to de-clutter the comment section. As used herein, obscuring the comment in answer could involve various techniques. In some cases, the question at block 510 and the auto reply at block 520 could be deemed to be lower priority comments and moved to the end of the comment section. As such, the comment and response may not be visible unless a reader is clicking through the entire comment section.

In some cases, the social media platform may monitor comments as they are being input, and may provide a pop up with an answer prior to the comment being posted. In this case, the comment may never be posted as the commenter has their answer. This is therefore a further technique for obscuring the question and answer.

In some cases, the social media platform may send a direct message to the user posting the comment and delete the comment from the comment section, thus obscuring the comment.

In some cases, obscuring the comment may be based on a confidence level that the engine has with the answer. For example, the confidence level can take into account the confidence that the engine has with regard to the whether or not a product question was asked, the confidence the engine has with the product identification, and whether or not the same product identified is found in an e-commerce site. Such confidence level may need to exceed a defined threshold in order for the social media engine to obscure the question from the comment section.

Further, in some embodiments, the engine at the social media platform may delete or substitute links to an e-commerce platform that is posted by a third party in response to a question in the comment section in order to prevent counterfeits, or links to malicious sites. For example, if a third party posts a link in response to the question, such link may lead to non-approved e-commerce sites, sites that sell counterfeit goods, or to links that contain malicious code. The engine may in this case leave the response but remove or substitute the link provided by the third party with a link determined by the engine.

For example, the engine at the social media platform may access a repository of known malicious or counterfeit sites. Such repository may, for example, be maintained based on past identified malicious or counterfeit sites, open-source intelligence such as tuning into other communities, electronic commerce platforms, social media platforms, security firms, among others, who list malicious or counterfeit domains. Further, the list may be maintained by the social media platform based on past links provided for other users that were flagged, for example utilizing information found by the social media platform from other comments or posts on the social media platform.

In other cases, the social media platform may store a list of approved e-commerce sites or platforms, and may compare the posted link with the stored list. The social media platform may remove links that are not found in the list of approved e-commerce sites. In some cases, merchants may need to register with the e-commerce platform to appear on the list of approved e-commerce sites.

Other options for removing links are also possible.

Training

In the embodiments of the present disclosure, various training may be performed for various engines to identify products and services, to identify e-commerce platforms, and to identify relevant questions with regard to the obtaining of information about products or services.

Specifically, the engine on the social media platform may be trained on millions of comments on the social media platform recognize product links and to look for previous questions to identify relevant social media questions that may be used within a comment section.

Figure 6:
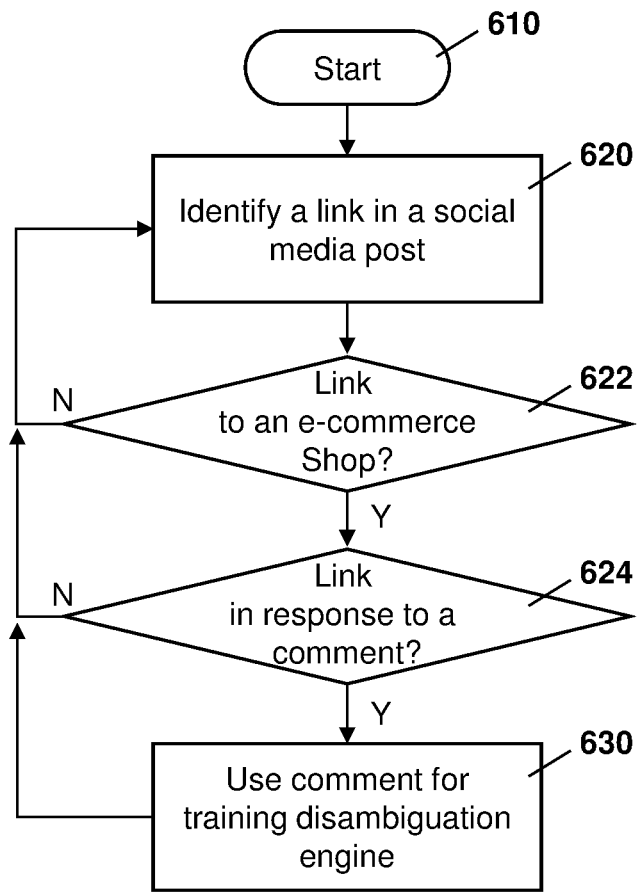
FIG. 6 is a process diagram showing an example process for training a disambiguation engine based on past questions in which a link to an e-commerce site was provided in response.

For example, reference is now made to FIG. 6, which shows a process for training a monitoring engine. In particular, the process starts at block 610 and proceeds to block 620 in which a link on a social media post within the social media platform is identified. For example, the social media platform may scrape all of the comments that are within the social media platform to look for any URLs or similar links.

The process then proceeds to block 622 in which a check is made to determine whether the link is to an e-commerce shop. For example, in some cases, the link may be followed and a determination of whether the page obtained by following the link sells goods or services may be made. In some cases, a library of common e-commerce platforms or sites could be maintained and the check at block 622 could compare the link or portions of the link with the sites in the library. Other options for the determination at block 622 are also possible.

From block 622, if the link is not to an e-commerce site then the process may proceed back to block 620 to continue to look for other links.

When the check at block 622 finds that the link is to an e-commerce shop or platform, the process then proceeds to block 624 in which a check is made to determine whether the link is posted in response to a comment. This may, for example, involve determining that the comment containing the link is a reply to a previous comment.

If the link is not posted in response to a comment, then it is not useful for training the monitoring engine and the process proceeds back to block 620 to look for other links.

When it is determined that the link is in response to a comment, the process proceeds to block 630 in which the comment may be used for training a monitoring engine. Specifically, by obtaining a plurality of comments, the monitoring engine could build a library of common terminology used to request information from an e-commerce site for training the monitoring engine.

From block 630, the process proceeds back to block 620 to look for further links.

Thus, a monitoring engine may be created by tracking historical presentations of product links and the preceding questions.

Further, training may involve image recognition techniques. For example, machine learning from potentially millions of images may be used to help identify objects within images or videos. Once identified, a database or look up for finding those same products sold on an e-commerce site may also be created and maintained in some cases. Such training could also use historic links found on the social media platform in which such links are associated with an e-commerce site selling a product or service. The training could involve parsing posted images associated with such questions and answers to provide a feedback loop.

Similar training could be applied to text within posts in order to help identify products or services associated with the post.

Based on the above, methods and systems are provided to identify when a question is being asked about a product or service within a social media post, and providing an answer with a link to an e-commerce site in response to such question being asked.

The elements described and depicted herein, including in flow charts and block diagrams throughout the figures, imply logical boundaries between the elements.

However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above, and combinations thereof may be embodied in computer executable code that, when executing on one or more computing devices, performs the steps thereof. In another aspect, the methods may be embodied in systems that perform the steps thereof and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

The invention claimed is:

1. A method at a computing system, the method comprising:
    identifying, for a post on a social media platform, a product or a service associated with the post;
    finding an e-commerce site selling the product or service;
    monitoring comments to the post on the social media platform;
    determining that a particular comment relates to obtaining the identified product or service;
    responding to the particular comment with a further comment, the further comment providing a link to the product or service on the e-commerce site; and
    substituting a link posted by a third party commenter with the link to the product or service on the e-commerce site.

2. The method of claim 1, wherein the product or service is identified includes using a link from a user that posted the post on the social media platform.

3. The method of claim 1, wherein the identifying is based on content of the post and/or subsequent comments by a user who made the post.

4. The method of claim 3, wherein a plurality of products or services are identified, the method further comprising ranking the plurality of products or services based on relevance within the post.

5. The method of claim 4, wherein the method further comprises using disambiguation to identify the product or service based on one or more questions in comments.

6. The method of claim 1, wherein the finding the e-commerce site comprises performing a search of a plurality of ecommerce sites for the identified product or service.

7. The method of claim 6, wherein the search comprises at least one of a text search and an image search.

8. The method of claim 1, further comprising obscuring the particular comment and the further comment.

9. A computer system comprising:
    a processor; and
    a communications subsystem,
    wherein the computer system is configured to:
    identify, for a post on a social media platform, a product or a service associated with the post;
    find an e-commerce site selling the product or service;
    monitor comments to the post on the social media platform;
    determine that a particular comment relates to obtaining the identified product or service;
    respond to the particular comment with a further comment, the further comment providing a link to the product or service on the e-commerce site; and
    substituting a link posted by a third party commenter with the link to the product or service on the e-commerce site.

10. The computer system of claim 9, wherein the computer system is further configured to identify the product or service based on a link provided by a user that posted the post on the social media platform.

11. The computer system of claim 9, wherein the computer system is further configured to identify based on content of the post and/or subsequent comments by a user who made the post.

12. The computer system of claim 11, wherein the computer system is further configured to identify a plurality of products or services associated with the post; and to rank the plurality of products or services based on relevance within the post.

13. The computer system of claim 12, wherein the computer system is further configured to use disambiguation to identify the product or service based on one or more questions in comments.

14. The computer system of claim 9, wherein the computer system is configured to find the e-commerce site by performing a search of a plurality of ecommerce sites for the identified product or service.

15. The computer system of claim 14, wherein the search comprises at least one of a text search and an image search.

16. The computer system of claim 9, wherein the computer system is further configured to obscure the particular comment and the further comment.

17. A non-transitory computer readable medium storing instruction code, that, when executed by a processor of a computer system cause the computer system to:
  identify, for a post on a social media platform, a product or a service associated with the post;
  find an e-commerce site selling the product or service;
  monitor comments to the post on the social media platform;
  determine that a particular comment relates to obtaining the identified product or service;
  respond to the particular comment with a further comment, the further comment providing a link to the product or service on the e-commerce site; and
  substituting a link posted by a third party commenter with the link to the product or service on the e-commerce site.

18. The non-transitory computer readable medium claim 17, wherein the instruction code is further configured to cause the computer system to identify the product or service based on a link provided by a user that posted the post on the social media platform.

* * * * *